324-77。 SR 1-7-75 XR 3,859,515

United States Patent [19]

[11] 3,859,515

[45] Jan. 7, 1975

Radcliffe, Jr.

[54] METHOD AND APPARATUS FOR SIGNAL SPECTRUM ANALYSIS BY HADAMARD TRANSFORM

[75] Inventor: Arthur J. Radcliffe, Jr., Ann Arbor, Mich.

[73] Assignee: Burroughs Corporation, Detroit, Mich.

[22] Filed: Oct. 2, 1973

[21] Appl. No.: 402,723

Related U.S. Application Data

[63] Continuation-in-part of Ser. No. 282,418, Aug. 21, 1972, abandoned.

[52] U.S. Cl. ....... 235/164, 324/77 R, 340/146.3 SY, 340/149 R

[51] Int. Cl. ............ G06k 9/00

[58] Field of Search ..... 235/164, 156; 340/146.3 A, 340/146.3 R, 146.3 Q, 146.3 SY, 149 R; 324/77 R

[56] References Cited

UNITED STATES PATENTS

| | | | |
|---|---|---|---|
| 3,618,019 | 11/1971 | Nemirovsky et al. | 340/146.3 SY |
| 3,699,517 | 10/1972 | Dyche | 340/146.3 SY |
| 3,742,201 | 6/1973 | Groginsky | 235/156 |
| 3,775,602 | 11/1973 | Alexandridis et al. | 235/156 |

OTHER PUBLICATIONS

H. C. Andrews, "Walsh Functions in Image Processing, Feature Selection and Pattern Recognition", IEEE Trans. on Electromagnetic Compatibility, Aug. 71, pp. 26–32.

*Primary Examiner*—Felix D. Gruber
*Assistant Examiner*—David H. Malzahn
*Attorney, Agent, or Firm*—Charles P. Padgett, Jr.; Edwin W. Uren; Edward G. Fiorito

[57] ABSTRACT

A method and apparatus for transforming the analog waveform of a signal into its Hadamard characterization by performing a matrix multiplication using the Hadamard matrix and for analyzing the resulting Hadamard characterization of the signal for identification purposes. A parallel adder system employing recirculating shift registers utilizes the unique properties of the Hadamard matrix so as to reduce the matrix multiplication required in the transformation to a minimal number of simple addition and subtraction operations.

22 Claims, 7 Drawing Figures

METHOD AND APPARATUS FOR SIGNAL SPECTRUM ANALYSIS BY HADAMARD TRANSFORM

CROSS-REFERENCE TO RELATED APPLICATIONS

This is a continuation-in-part of application Ser. No. 282,418 filed August 21, 1972 and now abandoned.

Reference is made to the following patents and patent applications assigned to the assignee of the present invention for a more detailed understanding of one or more of the possible fields of use for this invention: U.S. Pat. No. 3,818,443 to A. J. Radcliffe, Jr. entitled "Signature Verification By Pressure Pattern Zero Crossing Characterization;" U.S. Pat. No. 3,528,295 to Edwin O. Roggenstein, et al, entitled "Graphic Stylus;" U.S. Pat. No. 3,563,097 to Edwin O. Roggenstein, et al, entitled "Conversion of Handwriting Into Electrical Signals;" and U.S. Pat. No. 3,579.186 to Robert R. Johnson, et al, entitled "Personal Identification and Apparatus."

BACKGROUND OF THE INVENTION

This invention relates generally to signal identification techniques and more particularly to identification techniques wherein the original analog version of the signal to be identified is reversibly transformed into a second characterization which is then used to analyze the original waveform. The transformed characterization is compared with some stored reference signal and a determination is made as to whether or not the signals are substantially identical.

More particularly, this invention relates to a method and apparatus for performing a Hadamard transform on an analog waveform representing a signature pressure pattern. The transform employs a matrix multiplication wherein a first vector which represents the digital characterization of the original analog waveform is multiplied by the Hadamard matrix so as to produce a second vector which contains the Hadamard characterization of the original analog signal. An analysis is then performed upon the Hadamard characterization for identification purposes.

Analog signals are often converted into a digital characterization so as to allow the use of high speed data processing techniques. Furthermore, digital representations of analog signals are often used for identification purposes. For example, in the business and commercial world, positive identification is absolutely necessary in determining whether or not a particular signature is genuine in order to prevent the perpetration of fraud. A positive identification is deemed to occur whenever a comparison between a vector or set of Hadamard transformed values which represent the handwritten signature to be tested or verified and a stored reference set of values which represent a known signature results in a favorable correlation. Similarly, it is often useful to analyze audio signals in order to identify the voice or speaker.

A particular problem arises when a credit card is used to make a purchase and a third party guarantees payment. Most clerks who handle purchases of this nature are not sufficiently sophisticated to detect forgery and some simple fail-safe system of positive signature verification is required.

DESCRIPTION OF THE PRIOR ART

In the analog-to-digital conversion art it is wellknown that the amplitude of an analog signal at any given instant of time may be sampled and expressed in digital form. As the number of samples in a given time interval increases, the accuracy of the digital representation of the total waveform increases.

In the recognition or identification of such signals wherein the analog waveform was initially derived from a pressure pattern representing a handwritten signature, there are several overlapping yet well-defined areas wherein recent developments have taken place. For example, in the identification of written signatures, there have been advances in the design of writing instruments and writing surfaces and particularly in transducer means for converting the physical pressure exerted in writing a signature into an electrical analog signal. Similarly, there have been recent innovations in the identification techniques used to compare signals. Auto-correlation and cross-correlation circuitry has been devised in which a signal is compared to a previously recorded signal and analyzed for identification purposes. Finally, there have been some efforts made for developing circuitry for converting and manipulating the analog signals received from the transducing means associated with the writing implement so as to enable an easier or more accurate analysis.

More specifically, one prior art method for identifying handwritten signatures from their respective pressure patterns utilizes the so-called "Zero-Crossing" technique. This technique analyzes pressure patterns by isolating, through a band-pass filter or similar means, the frequency range in the pressure spectrum which represents the most significant fluctuations in the pressure signal. The resulting signal is processed and used as the basis for identification. However, it must be realized that this approach utilizes only a small portion of the information contained in the original pressure pattern or waveform.

More recent approaches to signal identification have involved the use of Fast Fourier Transform or FFT techniques which make use of the frequency spectrum of the pressure pattern. However, the electronic circuitry involved is expensive and complex since Fourier methods involve repeated multiplications and additions in even elementary operations because of the complex numbers involved in a Fourier analysis.

SUMMARY OF THE INVENTION

In view of the various problems and disadvantages associated with the prior art techniques, it is an object of the present invention to provide a new and improved method and apparatus for use in signature identification.

It is a further object of this invention to provide a method and apparatus for uniquely characterizing and identifying handwritten signatures based upon the pressure pattern generated while writing the signature.

It is still another object of the present invention to provide a method and apparatus for signal identification based upon the sequency of the signal spectrum rather than upon the frequency of the signal spectrum.

It is yet another object of the present invention to provide a simple, inexpensive, digital circuit for performing a matrix multiplication employing the Hadamard matrix in a minimal amount of steps.

It is still a further object of the present invention to provide a method and apparatus for transforming an analog waveform into the Hadamard characterization of the original waveform.

It is yet a further object of the present invention to provide a method and apparatus for obtaining the Hadamard transform of an analog signal in a minimal amount of time and cost and for utilizing the Hadamard characterization of the original analog waveform for signal identification.

These and other objects and advantages of the present invention are accomplished in a system which receives the electrical analog waveform which represents a handwritten signature from a pressure transducer and samples the analog waveform to obtain a digital characterization thereof. The values making up the digital characterization of the analog waveform are fed to a first set of inputs of a parallel adder. A second set of inputs is connected to a recirculating shift register coupled to the output of the adder. The values of the Hadamard matrix are generated and fed to a third input of the parallel adder and are used to determine whether the first and second sets of values are to be added or subtracted. Since the values of the Hadamard matrix are only capable of achieving values of plus or minus one, a matrix multiplication of the Hadamard matrix with the input vector made up of the digital values characterizing the original analog waveform is achieved by a simple series of simple addition and subtraction operations. At the end of the transformation, the values of the Hadamard characterization of the original signal are stored in the recirculating shift register and can be compared with a stored characterization of a particular signature in order to determine the presence or absence of a positive identification.

BRIEF DESCRIPTION OF THE DRAWINGS

The foregoing objects of the present invention, together with other objects and advantages which may be obtained by its use, will become more readily apparent upon reading the following description of the preferred embodiment of the invention taken in conjunction with the following drawings, wherein like reference numerals identify corresponding parts.

DETAILED DESCRIPTION OF THE INVENTION

In place of an extensive theoretical explanation of the concepts involved in matrix multiplication or in the use of Hadamard transforms, the following prior art will be referred to and the teachings thereof incorporated herein by reference:

"Hadamard Transform Image Coding" by Pratt, Kane and Andrews, Proceedings of the IEEE, Vol. 57, No. 1, January 1969; The Fast Fourier Hadamard Transform by J. E. Whelchel, Jr. and D. F. Guinn, published by Melpar in July, 1969; "Hadamard Transform Image Scanning" by J. A. Decker, Jr., Applied Optics, Vol. 9, No. 6, June, 1970; and "A Review of Orthogonal Square Wave Functions and Their Applications to Linear Networks" by J. L. Hammond, Jr. and R. S. Johnson; The Journal of the Franklin Institute, March, 1962.

The Hadamard function is a closed set of normal, orthogonal functions with each element of the set having either a value of plus one or a value of minus one. The property of orthogonality and the fact that all of the elements are either plus or minus one render the Hadamard function readily adaptable to digital processing techniques. Hence, the apparatus for handling Hadamard functions is much less expensive than that required to handle the corresponding Fourier function.

The term "sequency" may be considered as the number of sign or polarity changes in a given rectangular waveform. The most simple Hadamard matrix is illustrated by equation (1) below:

$$(1)\qquad \begin{bmatrix} 1 & 1 \\ 1 & -1 \end{bmatrix}$$

The rule for developing the Hadamard matrix is to repeat this basic matrix in the first, second and third quadrant and to put the negative of the matrix in the fourth quadrant. Thus a simple four by four Hadamard matrix would appear as shown in equation (2):

$$(2)\qquad \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The rows of the matrix can be rearranged so as to establish an increasing order of sequency as illustrated in equation (3) and a square matrix of any size can be generated in this manner:

$$(3)\qquad \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

As illustrated by the foregoing, it is readily seen that one benefit of the use of the Hadamard matrix is that the various elements of the matrix are simple numbers, either plus or minus one, rather than irrational numbers as encountered when undertaking a Fourier analysis. The fact that the Hadamard matrix consists solely of plus or minus ones, permits the use of addition and subtraction in lieu of multiplication and results in a considerable savings in apparatus and machine time.

Figure 1:
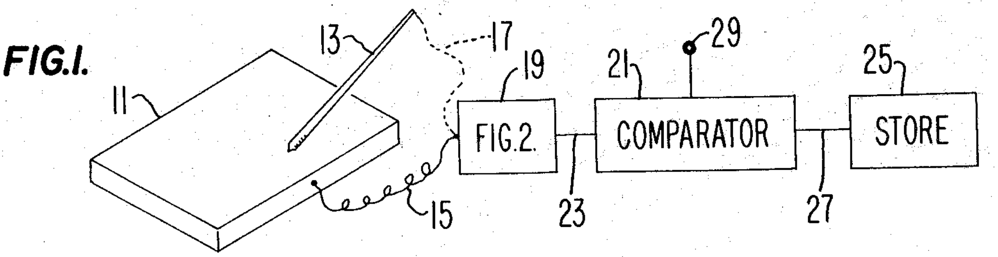
FIG. 1 illustrates, in block diagram form, a signature identification system.

Broadly stated, the present invention, as illustrated in FIG. 1, represents a signature identification system wherein a pressure transducing platen 11, or in the alternative, a pressure transducing writing element 13, is used to convert the pressure pattern of a handwritten signature to be tested into an electrical analog waveform representative thereof. This electrical analog waveform is transmitted from the pressure platen 11 via a lead 15, or in the alternative, from the pressure transducing writing element 13 via lead 17, to a Hadamard transform system represented by block 19. The Hadamard transform system converts the analog waveform into a digital representation of the original analog waveform and then operates to transform the digital representation into a Hadamard equivalent or transformed representation. The Hadamard equivalent representation is supplied to one input of a comparator 21 via lead 23 and the other input of the comparator 21 is supplied with a pre-recorded standard or reference from a memory or storage media 25 via lead 27. The comparator is able to determine whether or not an identity exists between the pre-recorded standard and the Hadamard equivalent of the original waveform representing a handwritten signature to be tested, and on the basis of this comparison a signal can be generated at the output 29 to indicate whether or not a positive identification of the original handwritten signature has been made.

Figure 2:
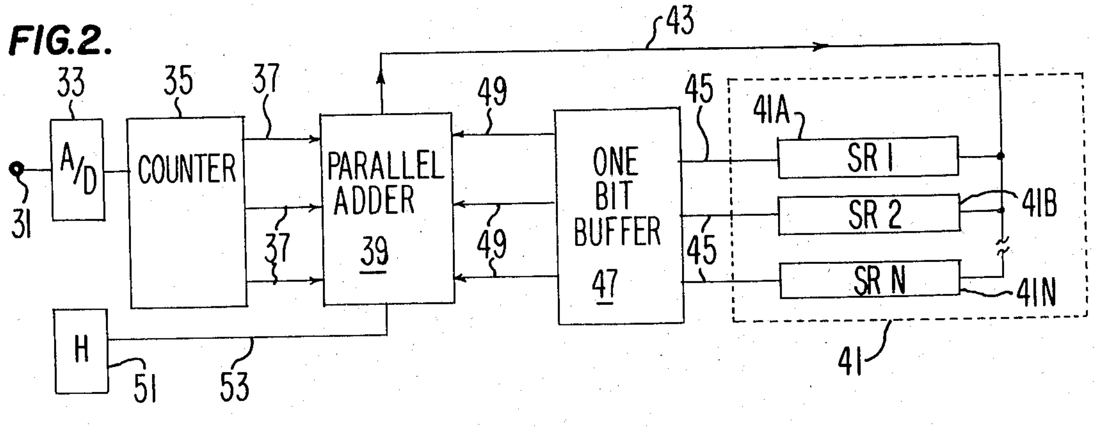
FIG. 2 illustrates, in block diagram form, a system for performing a Hadamard transform of an analog waveform which may be used in the system of FIG. 1.

FIG. 2 illustrates in more detail the Hadamard transform system 19 of the system of FIG. 1, and describes the apparatus employed to accomplish a Hadamard multiplication with a minimal amount of equipment in a minimal amount of steps. The original electrical analog waveform produced by the pressure transducer means 11 or 13 of the system of FIG. 1 is supplied to the input 31 of an analog-to-digital (A/D) converter 33. A binary counter 35 cooperates with the analog-to-digital converter and produces and stores a binary representation of the digital value of a particular sample of the analog signal. Parallel outputs 37 are taken from each of the bit positions of the binary counter 35 and provide a first set of inputs to a parallel adder 39.

The output of the parallel adder 39 is coupled to a set of parallel shift registers 41 via path 43 to form a recirculating configuration. The set of parallel recirculating shift registers 41 includes a single individual shift register 41A, 41B, . . . 41*n* for each bit position in a word used as one element in the output matrix and each individual shift register 41A, 41B, . . . 41*n* includes as many bit positions per register as there are rows or columns required in the Hadamard matrix. The outputs 45 of the individual recirculating shift registers are fed to a one bit buffer 47 which will store one word at a time. Parallel outputs 49 transfer the word in a bit parallel manner to a second set of inputs to parallel adder 39. A Hadamard matrix generator 51 is used to supply, in a sequential manner, the elements of the Hadamard matrix into a third input of parallel adder 39 via lead 53.

The Hadamard matrix generator may include apparatus for sequentially generating the values of an "$n \times n$" Hadamard matrix, as known in the prior art, or may, in the alternative, sequentially generate or call up stored or programmed values of the Hadamard matrix. The arrival of a signal from the Hadamard matrix generator to the third input of the parallel adder 39 via the lead 53 will determine whether or not the set of values currently stored in the counter 35 is to be added to or subtracted from the set of values currently stored in the one bit buffer 47. After the addition or subtraction, the total is transferred back to the last word position of the set of parallel recirculating shift registers 41 via lead 43 and the contents of the first word position are shifted into the one-bit buffer 47.

The A/D converter-counter arrangement may assume any of the forms known in the A/D art provided that a word can be transferred in a bit parallel manner into the parallel adder. For example, the A/D converter 33 may include a sawtooth generator and a means for comparing the amplitude of the sawtooth with the sampled value of the input signal. When the two are equal, a flip-flop is set which can be reset at the start of each cycle of the sawtooth. The flip-flop gates a clock running at a predetermined rate such that the number of clock pulses emitted by the gate is proportional to the amplitude of the sampled waveform. The string of generated clock pulses can then be fed into a counter 35 which acts as an input to the parallel adder 39.

Figure 3:
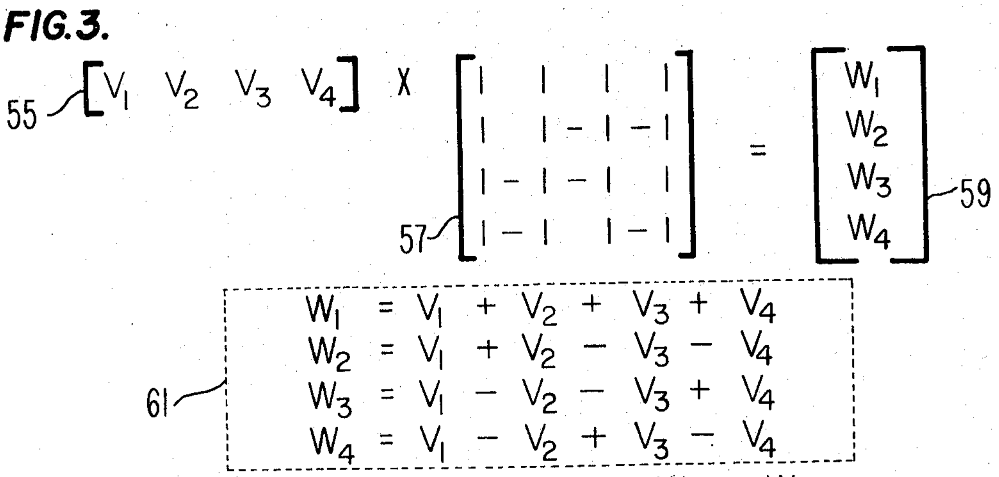
FIG. 3 illustrates a matrix multiplication employing the Hadamard matrix and shows the results obtained therefrom.

FIG. 3 represents mathmatically the Hadamard transformation technique. A first vector or matrix 55 is shown as having four elements $V_1$, $V_2$, $V_3$, and $V_4$. In the prime embodiment disclosed herein, the values of each of these individual elements would be that of the individual digital samples of the original electrical analog signal as generated in binary counter 35 and the vector or matrix 55 would represent or contain the digital equivalent of the original analog waveform.

The matrix 57 is a $4 \times 4$ Hadamard matrix. Methods for generating or developing the Hadamard matrix may be found in the prior art. Examination of the Hadamard matrix 57 on a row-by-row basis shows that the first row contains all positive ones and represents a zero sequency change because the sign or polarity of the elements of the row never changes. This will be referred to as sequency zero. The second row of the $4 \times 4$ Hadamard matrix represents sequency one and it is seen that the sign changes a single time while traversing the row. The third row of the Hadamard matrix is referred to as sequency two and involves two sign changes while the fourth and last row of the $4 \times 4$ Hadamard matrix is referred to as sequency three and represents three distinct sign changes. It is also seen that the same sequencies appear in a column-by-column approach.

By the normal rules of matrix multiplication, the multiplication of the one-dimensional input matrix 55 by the square matrix 57 will result in the one-dimensional output vector or matrix 59. The values of the elements of the transformed matrix 59 are represented by the terms $W_1$, $W_2$, $W_3$ and $W_4$. This matrix or vector 59 represents the Hadamard equivalent of the original analog waveform and may be used as a unique characterization or representation of the original signal. The equations within the block labeled 61 illustrate the result of the Hadamard matrix multiplication and give the values of the elements of the transformed matrix. Since the values of the Hadamard matrix are either $\pm 1$, it is seen that the normally complicated matrix multiplication reduces to simple additions and subtractions with the values of the elements of the resulting output matrix being formed by adding or subtracting the elements of the input vector 55. Whether an element is added to or subtracted from another element is determined by the sign of the corresponding element of the Hadamard matrix, hence the additions or subtractions follow the polarity of the elements of the Hadamard matrix.

Figure 4:
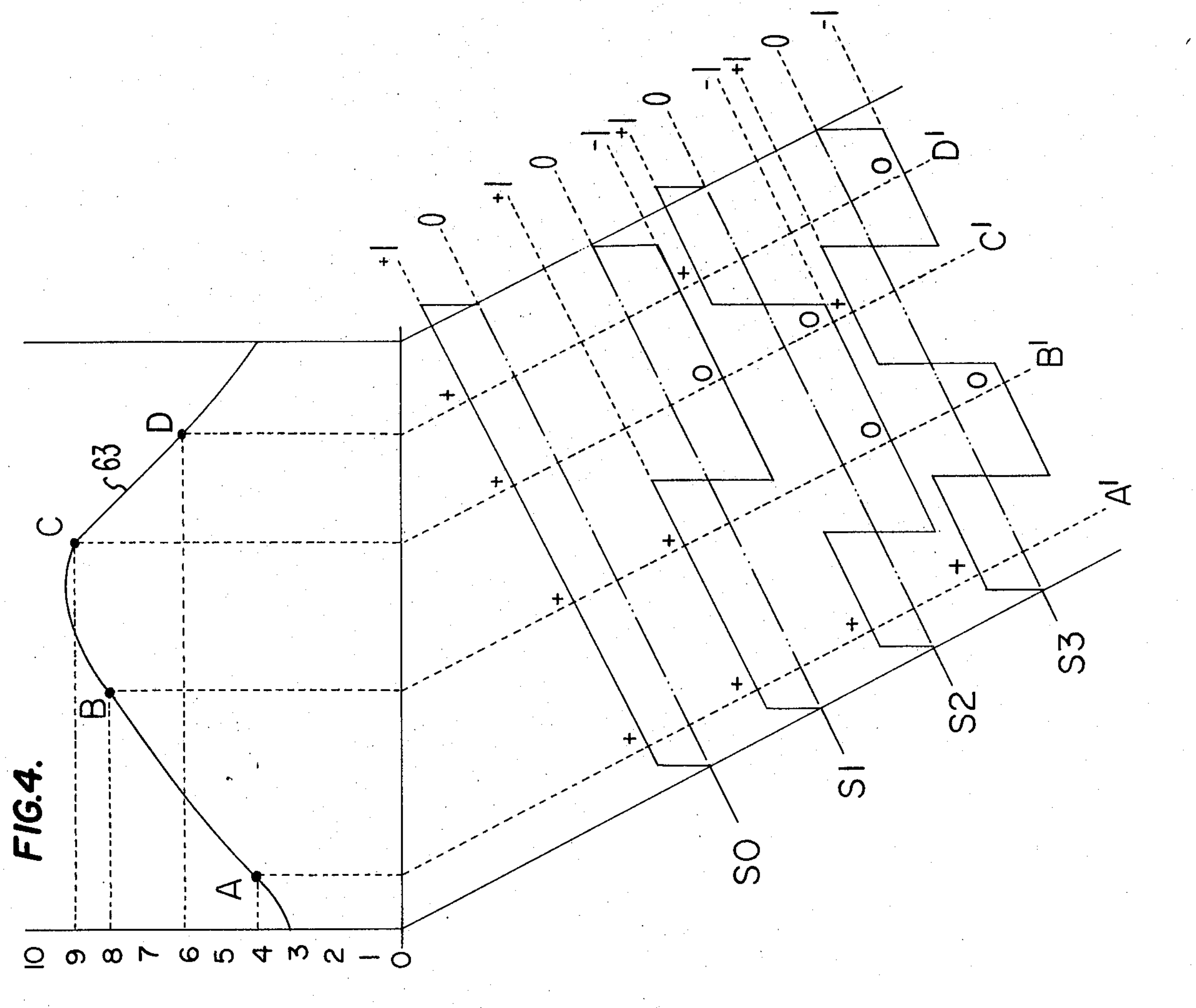
FIG. 4 is a graphical representation of an analog waveform and the first four rows of the Hadamard matrix.

FIG. 4 shows an electrical analog waveform 63 with samples taken at four points, A, B, C and D. The A sample has a value of 4; the B sample has a value of 8; the C sample has a value of 9; and the D sample has a value of 6. The vector or matrix containing the digitized value of samples A, B, C and D would therefore be a digital representation of the original analog waveform and could be given by the matrix 55 of FIG. 3. The square wave signal labeled $S_0$ determines sequency zero from the first row of the Hadamard matrix and it is seen to have a value of +1 at all times. The second square wave labeled $S_1$ determines sequency one and corresponds to the second row of the Hadamard matrix. This waveform represents a single sign change and it is seen that at sample time A and sample time B it has a value of +1 whereas at sample time C and D it has a value of −1. The third square wave is labeled $S_2$ and illustrates sequency two or the third row of the Hadamard matrix. This waveform represents two sign changes and it is seen at sample time A it has a value of +1 while at sample times B and C it has a value of −1 and at sample time D it again has a value of +1. The fourth and last square wave is labeled $S_3$ and illustrates sequency three or the fourth and last row of the 4 × 4 Hadamard matrix. At sample time A the Hadamard matrix has a value of +1; at sample time B, a value of −1; at sample time C, a value of +1; and at sample time D, a value of −1.

The illustrations of FIG. 4 can also be examined so as to gain some insight into the method of the present invention. If the individual sequencies are used to transform the input vector, i.e., the digitized values of the samples of A, B, C and D, then it is seen that the transformed or output values are given by adding or subtracting the digitized values or the samples A, B, C and D across each of the sequencies of the Hadamard matrix. For example, the value of element $W_1$ of FIG. 3 would be obtained by processing the values of the samples A, B, C and D across the sequency zero and since all of the values of sequency zero are +1, the values of the samples A, B, C and D would be added to form the sum $W_1 = 4+8+9+6 = +27$. Similarly, the sample values would be processed across sequency one to obtain the value $W_2 = 4+8-9-6 = -3$; the sampled values would be processed across sequency two to yield $W_3 = 4-8-9+6 = -7$ and across sequency three to yield $W_4 = 4-8+9-6 = -1$.

Following the individual sample times as they intersect the various sequencies it is seen that a column-by-column approach yields an identical Hadamard matrix and it becomes apparent that the values of the output vectors $W_1$, $W_2$, $W_3$ and $W_4$ could be developed simultaneously by a series of partial sums. The value of sample A would therefore be added to or subtracted from each of the words $W_1$, $W_2$, $W_3$ and $W_4$ in accordance with the sign of a corresponding element in the first column of the Hadamard matrix. Similarly, the value of the B samples could be added to or subtracted from the partial sum at each word location in accordance with the sign of a corresponding element in the second column of the Hadamard matrix, etc. After all four of the sampled values had been added to or subtracted from the partial sums, we would be left with the output vector or matrix 59 with the values being $W_1 = +27$; $W_2 = -3$; $W_3 = -7$; and $W_4 = -1$ as indicated above in the row-by-row approach.

Figure 5:
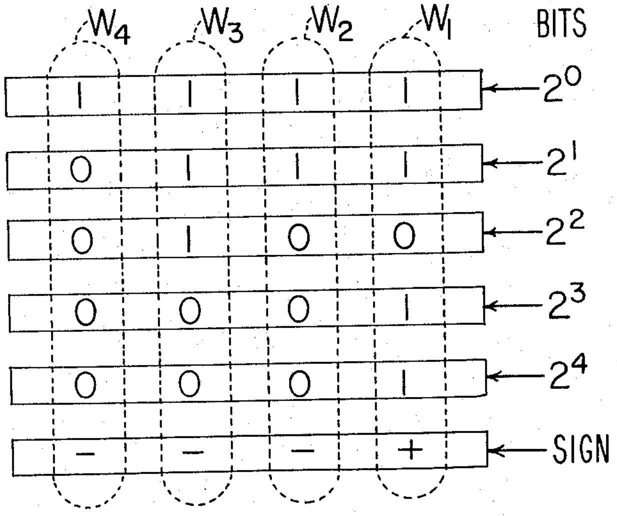
FIG. 5 is a graphical illustration representing the various words and bit positions involved in the recirculating shift registers of the circuit of FIG. 2.

FIG. 5 is meant to illustrate the four word positions $W_1$, $W_2$, $W_3$ and $W_4$ which would be required in a recirculating shift register if a 4 × 4 Hadamard matrix were employed. For illustrative purposes assume that four word positions, $W_1$, $W_2$, $W_3$ and $W_4$ are required to ultimately contain the values representing the four elements of the resulting transformed matrix of FIG. 3. FIG. 5 shows, for illustrative purposes, six rows which illustrate the bit positions within the words $W_1$ thru $W_4$ which are represented by columns. One of the rows is used to show a sign so as to indicate, for illustrative purposes, whether the binary number stored in that column or word is positive or negative.

Figure 6:
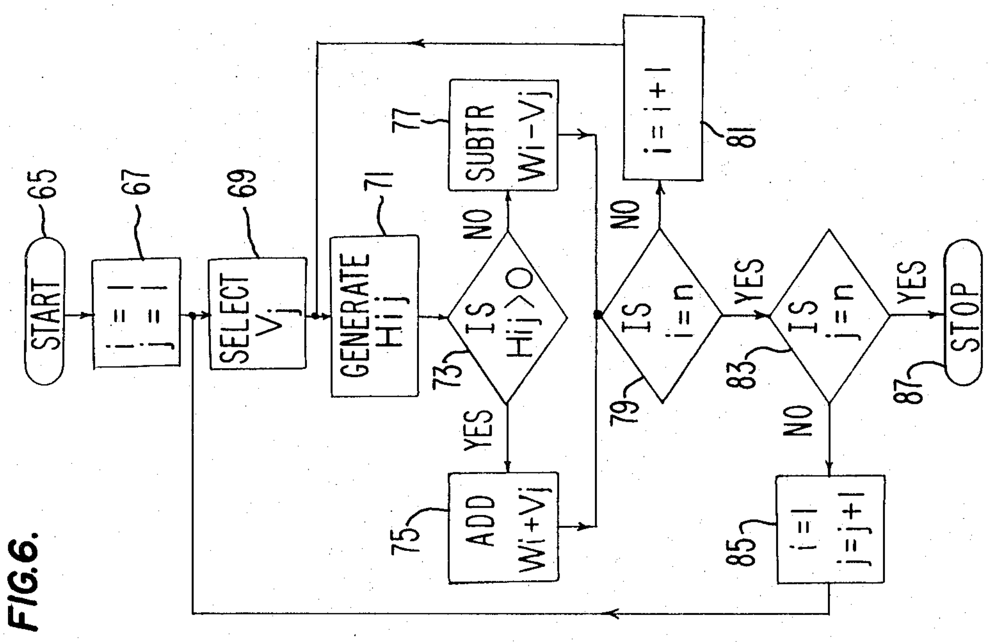
FIG. 6 is a flow diagram illustrating the method of operation of the system of FIG. 2 for performing a Hadamard matrix multiplication.

FIG. 6 shows a flow chart which may be used to illustrate the method of Hadamard matrix multiplication employed by the apparatus of FIG. 2. The flow chart illustrates a method for multiplying a one dimensional input vector or matrix containing the values $V_1$ thru $V_n$ by a Hadamard matrix having "*n*" rows and "*n*" columns. Block 65 represents the start of the matrix multiplication and it is assumed, initially, that all of the values or subtotals $W_1$ thru $W_n$ are initially zero. Block 67 sets the value of "*i*" and the value of "*j*" equal to "1" and block 69 indicates which of the elements of the input vector are currently being processed. Block 71 dictates the generation of the value of the Hadamard matrix appearing in the first row, first column; and block 73 asks whether or not this element is positive. If the element is positive the operation proceeds via the "yes" path and, as indicated by block 75, the value represented by the selected element of the input vector $V_1$ is added to the subtotal currently stored in the selected word location $W_1$. If the value of the generated Hadamard matrix element is negative, the operation proceeds via the "no" path and, as directed by block 77, the value $V_1$ is subtracted from the value currently stored in the first word location $W_1$. Block 79 inquires as to whether or not the value of "*i*" is equal to "*n*." If the value is not equal to *n*, the operation proceeds via the "no" path to block 81 where the value of *i* is incremented by 1 and the flow chart is re-entered to generate the next successive element in the currently selected column of the Hadamard matrix presently under consideration. If the value of *i* is equal to *n*, which indicates that all of the *n* elements contained in the column of the Hadamard matrix currently under consideration have been processed, block 83 requires an inquiry into whether or not the value of *j* is yet equal to *n*. If *j* is not equal to *n*, the "no" path directs further processing to block 85 wherein the value of *i* is again initialized to 1 and the value of *j* is incremented by 1. With these new values the operation returns to the flow chart and selects the next successive element of the input vector for processing. The method will continue in this manner until $i = n$ and $j = n$ which will indicate that the final element of the input vector has been processed in accordance with the sign of the element located in the last row and last column of the $n \times n$ Hadamard matrix, at which time the "yes" path from block 83 will be followed to terminate the operation as indicated by block 87.

Figure 7:
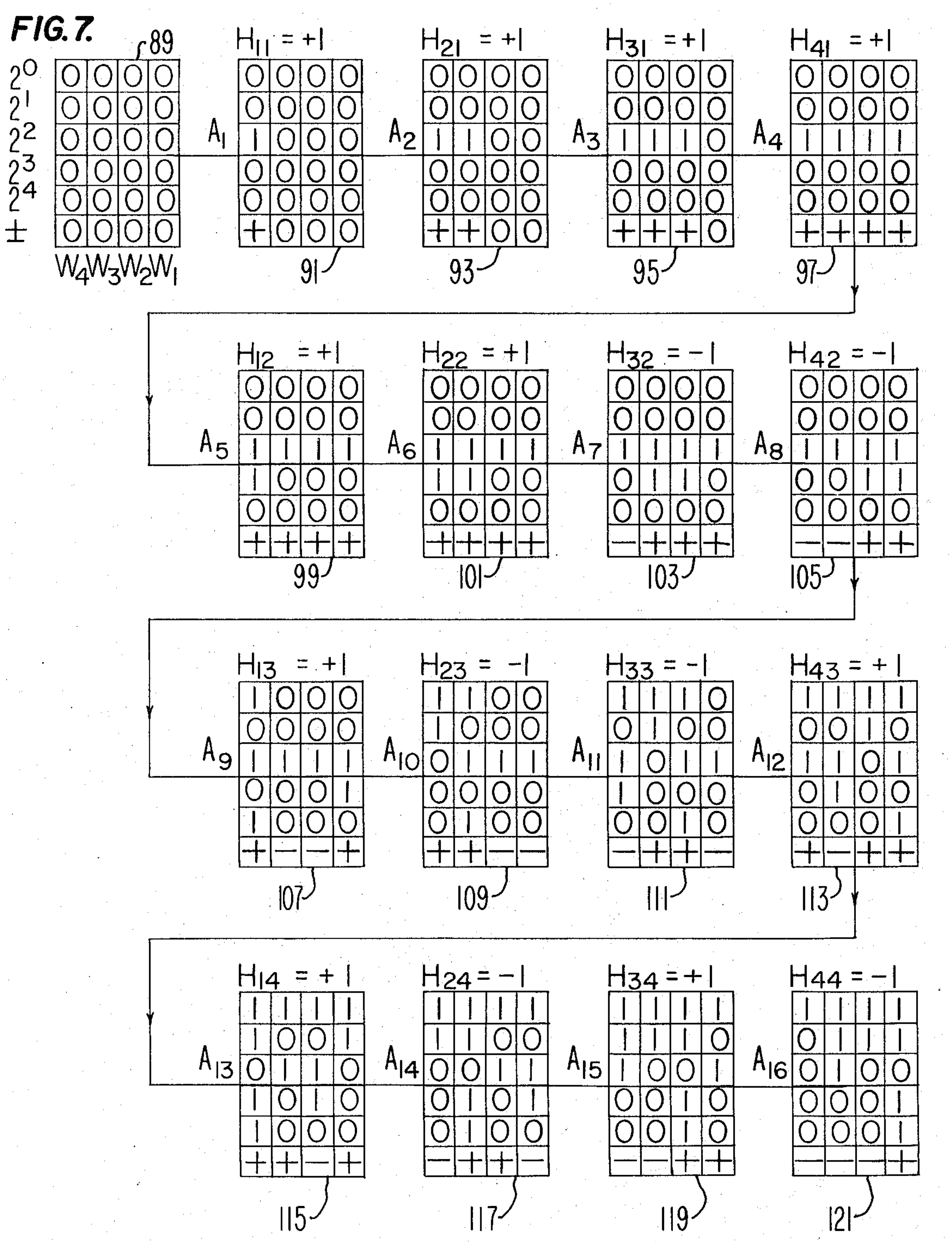
FIG. 7 is a tabular illustration of the sequential states of a four word shift register at each stage of the Hadamard matrix multiplication.

FIG. 7 depicts a step by step sequential illustration of the states of the four recirculating shift registers 41 when operating with a 4 × 4 Hadamard matrix. Each of the blocks of FIG. 7 follow the format of the illustration of FIG. 5 and contains four columns or word locations $W_1$, $W_2$, $W_3$ and $W_4$. Each of these word locations is used to store the partial sums developed during the matrix multiplication discussed hereinabove until, and at the end of the matrix multiplication or transformation, the binary values stored in these columns will represent the values of the transformed vector or output matrix 59 of FIG. 3. Each of the blocks includes five rows of bit positions representing the one's position, two's position, four's position, eight's position, and 16's position of each of the 4 words or columns. A sixth row is used to show a sign to illustrate whether or not the value stored in that word location is positive or negative. The blocks are connected by lines having the letter "A" followed by a number printed thereabove. Each of these letter-number combinations represents a single sequential step of addition or subtraction which results in the state of the registers as depicted in the next successive block. The number appearing above each block represents the value of the particular element in the Hadamard matrix which was used in arriving at the state of the registers depicted in the corresponding block.

The operation of the circuit of FIG. 2 will now be discussed with reference to FIGS. 2-7. The analog waveform 63 of FIG. 4 is sampled at four points A, B, C and D. The digital values of these four samples provide the values $V_1$, $V_2$, $V_3$ and $V_4$ which make up the elements of input vector 55 which, in the present example, would take on values of +4; +8; +9; and +6 respectively. This input vector is multiplied with a 4 × 4 Hadamard matrix to produce a vector which serves as the Hadamard characterization of the original vector. The output vector or transformed matrix 59 includes elements $W_1$, $W_2$, $W_3$ and $W_4$. As illustrated in FIG. 3, matrix multiplication with the Hadamard matrix involves a simple series of additions and subtractions, hence each of the transformed elements $W_1$, $W_2$, $W_3$ and $W_4$ are made up of sums and differences of the vectors $V_1$, $V_2$, $V_3$ and $V_4$ with additions or subtractions being performed in accordance with the sequency or the number of sign changes in each row of the Hadamard matrix.

Block 61 of FIG. 3 illustrates that each of the original digitized values $V_1$, $V_2$, $V_3$ and $V_4$ appear in each of the W terms of the resulting vector and that the sign before each of the terms corresponds to the sign appearing in a corresponding row and column of the Hadamard matrix.

Broadly speaking, the circuit of FIG. 2 operates so that the input 31 to the A - D converter 33 is supplied with the electrical analog equivalent of the pressure signal representing a particular handwritten signature. This analog signal is converted to a set of digital values which are sequentially generated in binary form in the counter 35. An output from each of the bit positions of the stored binary value is connected to a corresponding input of a corresponding bit position in parallel adder 39. A Hadamard matrix generator 51 will sequentially generate a set of values corresponding to the various elements of the Hadamard matrix. For the example given, a 4 × 4 Hadamard matrix multiplication will require the generation of 16 values. The values are generated or removed from memory in a sequential manner as shown in FIG. 6, by starting at column 1 of row 1 and proceeding down the column via column 1 row 2, column 1 row 3, column 1 row 4, column 2 row 1, etc., until all 16 values have been generated. The rate of generation of these values determines the speed of operation of the system. As each value from the Hadamard matrix is applied to the third input of the parallel adder 31 via the Hadamard matrix generator 51 and lead 53, the parallel adder 39 is told whether to add or subtract the binary value stored in counter 35 to the number currently stored in the one bit buffer 47. The result is then transferred back to the opposite end of the shift register 41 via output 43.

The method of Hadamard matrix multiplication employed in the operation of the apparatus of FIG. 2 will now be described for the sampled values shown in FIG. 4 with reference to all of the Figures previously mentioned. The sampled values A, B, C and D are obtained by the A-D converter 33 and the binary equivalent of these numbers is produced by counter 35. These values will make up the input vector or matrix 55 with $V_1 = +4$; $V_2 = +8$; $V_3 = +9$; and $V_4 = +6$. In the particular example discussed herein, $n = 4$, hence a 4 × 4 Hadamard matrix will be utilized as illustrated by matrix 57 of FIG. 3. Block 89 of FIG. 7 indicates that all of the values stored in the recirculating shift register are initially 0. Referring to the flow chart of FIG. 6, the values of $i$ and $j$ are initially set to 1, hence the selected element of the input vector becomes $V_1$ or, in the present example, +4. The $H_{11}$ element of the Hadamard matrix is generated and since it is positive, the value of $V_1$ is added to the zeros currently stored in word position $W_1$ during step $A_1$; the state of the shift registers then appearing as shown in block 91. Since $i$ is not yet equal to 1, its value is incremented, and as $i$ becomes 2, the element $H_{21}$ in row 2, column 1 of the Hadamard matrix is generated. Since this element is also positive, $V_1$ is added to $W_2$ during step $A_2$; the state of the registers then appearing as shown in block 93. It is assumed that within each block the shifts in the recirculating shift registers proceed from left to right. Since $i$ is not yet equal to 4, it is incremented and the third element $H_{31}$ of the first column of the Hadamard matrix is generated. Since this value is also positive, $V_1$ is added to $W_3$ during step $A_3$ with the resulting state of the registers appearing as shown in block 95. Since $i = 3$, it is again incremented and the fourth element $H_{41}$ of the first column of the Hadamard matrix is generated. This value is also positive, hence $V_1$ is added to $W_4$ during step $A_4$, the resulting state of the registers appearing as shown in block 97.

At this point, since $i = 4$ and $j$ is not equal to 4, the value of $i$ is reset to 1 and the value of $j$ is incremented by 1. The next value of the input vector $V_2$ is thereby selected and the second column of the Hadamard matrix will be used for processing $V_2$. The element $H_{12}$ of the Hadamard matrix appearing in the first row of the second column is generated and since it is positive, $V_2$ is added to $W_1$ during step $A_5$ with the state of the registers appearing as shown in block 99. Since $i$ is less than 4, its value is incremented by 1 and the next successive element $H_{22}$ of the second column of the Hadamard matrix is generated. This is repeated in steps $A_6$, $A_7$ and $A_8$ with the states of the registers appearing as shown in blocks 101, 103 and 105 respectively. At this point, $i$ is again equal to 4 and since $j$ is not yet equal to 4, the value of $i$ is reset to 1 and the value of $j$ is incremented so as to select the next successive value of the input vector element $V_3$. The value of $V_3$, a +9, will be either added to or subtracted from the partial sums stored in the recirculating shift register in accordance with the values or signs of the elements of the third column of the Hadamard matrix during steps $A_9$, $A_{10}$, $A_{11}$ and $A_{12}$ with the registers appearing as shown in blocks 107, 109, 111 and 113.

Once again $i$ is equal to 4 and $j$ is not equal to 4, hence $i$ is reset to 1 and $j$ is incremented to select the fourth and last element of the input vector $V_4$. $V_4$ will be added to or subtracted from the word locations $W_1$ thru $W_4$ in accordance with the sign of the Hadamard elements appearing in the fourth and last column of the Hadamard matrix during steps $A_{13}$, $A_{14}$, $A_{15}$ and $A_{16}$ with the corresponding states of the registers appearing as shown in blocks 115, 117, 119 and 121 respectively. After step $A_{16}$ the value of $i$ and the value of $j$ are both equal to 4 indicating that all of the elements of the Hadamard matrix have been generated and that the values stored in the block 121 represent the Hadamard characterization or transformed output matrix 59 with $W_1 = +27$; $W_2 = -3$; $W_3 = -7$; and $W_4 = -1$ as indicated above.

This set of values or output vector or transformed matrix 59 is the Hadamard characterization or representation of the original analog signal and the transformation has been accomplished with a minimal amount of equipment in a minimal number of steps.

A similar one-dimensional vector or set of values representing a known Hadamard representation or characterization of a particular individual's handwritten signature can be stored in a memory or pre-recorded on a magnetic media or the like. The values generated as a result of the Hadamard transform and contained in the recirculating shift registers at the end of the summing operations can be compared in comparator 21 to the pre-recorded values obtained from memory means 25 and an indication as to whether or not a positive identification has been made can be taken from output 29.

The prime embodiment disclosed herein refers to electrical analog signals representing the pressure spectrum of a particular individual's handwritten signature but it will be readily apparent to those skilled in the art that the particular source of the electrical analog signal in no way limits the present invention. Nor is the discussion as to the use of the present invention in a system employing credit cards wherein a digital representation of a handwritten signature or of the Hadamard equivalent thereof is stored on the card itself meant to limit the scope of the invention. The system does, however, have particular application in such systems because of the greatly simplified circuitry involved and the savings in time and money resulting from the present method and apparatus for performing the Hadamard transform.

With this detailed description of the operation of the present invention, it will be obvious to those skilled in the art that various modifications can be made without departing from the spirit and scope of the invention which is limited only by the apended claims.

What is claimed is:

1. Apparatus for providing a Hadamard characterization of an analog signal comprising:

means for providing a digital representation of an analog signal;

means for sequentially generating the elements of the Hadamard matrix;

storage means; and adder means coupled to said means for providing a digital representation, to said Hadamard matrix generator and to said storage means, said adder means responsive to the value supplied by said Hadamard matrix generator for adding the digital representation of said analog signal to the value stored in said storage means when said Hadamard matrix element is positive and for subtracting the digital representation from the value stored in said storage means when said Hadamard matrix element is negative.

2. The apparatus of claim 1 wherein said adder means includes a parallel adder having a first set of inputs for receiving, in parallel, said digital representation, a second set of inputs for receiving, in parallel, the value stored in said storage means, and a third input for receiving elements of the Hadamard matrix.

3. The apparatus of claim 2 wherein said means for generating the values of the Hadamard matrix includes a memory means for storing the values of the Hadamard matrix and for recalling the stored values in a predetermined sequence.

4. The apparatus of claim 2 wherein said means for providing a digital representation of the analog signal includes analog-to-digital conversion means for sampling the original analog signal and means for storing a binary number representing the sampled value.

5. The apparatus of claim 4 wherein said means for storing a binary number includes a binary counter means having parallel output means coupling each of the bit positions of said binary counter means to said first set of inputs of said parallel adder means.

6. The apparatus of claim 2 wherein said adder means further includes output means for receiving the result of the addition or subtraction and for storing said result back into said storage means.

7. The apparatus of claim 6 wherein said storage means includes a plurality of parallel shift registers, there being an individual shift register for each bit position required in the Hadamard characterization of the analog signal and wherein each register includes a number of bit positions equal to the number of rows or columns in the Hadamard matrix being utilized.

8. The apparatus of claim 7 wherein said storage means includes a one bit buffer means having a bit position coupled to a corresponding one of said parallel shift registers and an output from each of the positions of said one bit buffer means coupled to a corresponding one of said second set of input means.

9. The apparatus of claim 8 wherein said storage means further includes means for coupling the outputs of said plurality of parallel shift registers to a corresponding bit position in said one bit buffer and means for coupling the output of a corresponding bit position in said one bit buffer to a corresponding bit position in the parallel adder means; and wherein the output means of said adder means includes means for coupling the output of the parallel adder back to corresponding inputs of said plurality of parallel shift registers to form a recirculating configuration.

10. Apparatus for verifying the authenticity of a handwritten signature by comparing an electrical characterization of the handwritten signature to be tested with a pre-recorded value or known specimen, said apparatus comprising:

means for converting the pressure variations involved in generating a handwritten signature into an electrical analog signal;

means for generating a digital representation of the analog signal;

means fc r performing a Hadamard transform on the digital representation of the electrical analog signal; and means for comparing the Hadamard characterization of the signature produced as the result of performing the Hadamard transform on the digital representation of the electrical analog signal with said pre-recorded value.

11. The apparatus of claim 10 wherein said comparison means includes a means for indicating whether or not the authenticity of the handwritten test signature is verified; and wherein said means for converting pressure variations includes pressure-responsive transducer means.

12. The apparatus of claim 10 wherein said means for performing a Hadamard transform includes:

means for generating a binary number representing a sampled value in the analog waveform;

means for generating Hadamard matrix signals;

recirculating shift register means for storing partial sums; and adder means responsive to said Hadamard matrix signals for adding said generated binary number to and subtracting said binary number from a preselected one of the partial sums stored in said recirculating shift register means.

13. In a signature verification system wherein an individual's handwritten signature which is to be tested is converted into a test vector which is to be compared to a stored vector representing a particular individual's known signature, the improvement comprising:

means for performing a Hadamard transform on said test vector to produce a set of values comprising a transformed test vector; and means for comparing said transformed test vector with said stored vector to determine the authenticity of the tested handwritten signature.

14. An apparatus for multiplying a one dimensional matrix having $n$ elements by an $n \times n$ Hadamard matrix comprising:

means for generating the elements of the Hadamard matrix in a predetermined sequence;

means for initially selecting the first element of the one dimensional matrix and for subsequently selecting the next successive element whenever $n$ Hadamard matrix elements have been generated;

means for storing $n$ partial sums and for addressing the next successive partial sum whenever another Hadamard element has been generated;

adder means coupled to said selecting, generating and storing means and responsive to the generation of a positive Hadamard element for adding the selected element of the one dimensional matrix to the currently addressed partial sum and responsive to the generation of the negative Hadamard matrix element for subtracting the selected element of the one dimensional matrix from the currently addressed partial sum.

15. The apparatus of claim 14 wherein said means for generating the elements of the Hadamard matrix includes means for assuring that the elements are generated in a sequential order beginning with the first row of the first column of the Hadamard matrix and proceeding down the elements of each of the columns until the $n$th value of a column has been reached and then proceeding to the first row of the next successive column and down the column until the $n$th element of the $n$th column has been generated.

16. The apparatus of claim 14 wherein said means for selecting elements of the one dimensional matrix includes binary counter means for storing the binary representation of a number and means for outputting the binary number in a bit parallel manner.

17. The apparatus of claim 16 wherein said adder means includes a parallel adder having a first set of inputs for receiving in a bit parallel manner the binary number stored in said selecting means, a second set of inputs for receiving in a bit parallel manner the values currently stored in a selected one of said $n$ partial sums, and a third input means for sequentially receiving the generated elements of the Hadamard matrix.

18. The apparatus of claim 17 wherein said adder means further includes output means for receiving the value resulting when said selected element is added to or subtracted from the value stored in a partial sum and for transferring this resulting value back to said means for storing partial sums in a recirculating fashion.

19. The apparatus of claim 18 wherein said means for storing and addressing partial sums includes a set of parallel shift registers, the output of each being coupled to the second set of inputs of the parallel adder and the output means of the parallel adder being coupled back to the inputs of the set of parallel shift registers, each one of said set of parallel shift registers having $n$ bit positions such that each one of the bit positions of a particular parallel shift register stores one bit of the partial sum.

20. A method of signature identification employing a pre-recorded coded representation of a reference signature, said method comprising the steps of:

converting pressure variations inherent in the actual writing of a handwritten signature to be tested into an electrical analog signal;

sampling the electrical analog signal to produce a digital representation thereof;

generating, in a predetermined column-by-column sequence, the elements of the Hadamard matrix;

storing, in a predetermined sequence, the elements of a set of values representing said digital representation such that a new element of said set of values will be stored before the first element of a new column of the Hadamard matrix is generated;

forming partial sums by adding said stored element of said set of values representing said digital representation to a partial sum for every occurrence of a positive Hadamard element, and for subtracting said stored element of said set of values representing said digital representation from said partial sum for the occurrence of every negative Hadamard element until all of the elements of the Hadamard matrix have been generated; and comparing the Hadamard transformed set of values representing the handwritten signature to be tested which is represented by the final partial sums with the pre-recorded coded representation of the reference signature for identification purposes.

21. In a system for verifying the authenticity of a handwritten signature to be tested, said system including means for providing a pre-recorded set of values representing a particular known handwritten signature and pressure transducer means for converting the pressure variations inherent in writing a handwritten signature to be tested into an electrical analog waveform, a method of signature verification comprising the steps of:

sampling the electrical analog waveform for producing a set of digital values;

performing a Hadamard transformation on the set of digital values; and comparing the set of transformed values with said pre-recorded set of values for identification purposes.

22. A method of multiplying a one dimensional matrix having $n$ elements $[V_1, V_2, \ldots V_n]$ by an $n \times n$ Hadamard matrix comprising the steps of:

storing the first element of said one dimensional matrix;

sequentially generating the individual elements of the first column of said $n \times n$ Hadamard matrix;

adding the value of said stored first element of said one dimensional matrix to one of a set of $n$ subtotals for each positive element in the column of the Hadamard matrix being generated and subtracting the value of said stored first element from one of said set of $n$ subtotals for each negative element in the column of the Hadamard matrix being generated, the particular one of said set of $n$ subtotals corresponding to the numbered position of the element in the column of the Hadamard matrix currently being generated;

removing said stored element and storing the next successive element when the $n$th element of the selected column of the Hadamard matrix has been generated;

sequentially generating the individual elements of the next successive column of the Hadamard matrix;

adding the value of said stored element to one of a set of $n$ subtotals for each positive element in the column of the Hadamard matrix being generated and subtracting the value of said stored element from one of a set of $n$ subtotals for each negative element in the selected column of the Hadamard matrix being generated; and repeating said steps of storing an element, sequentially generating the individual elements of the next successive column of the Hadamard matrix and adding and subtracting in accordance with the sign of the Hadamard elements until the $n$th element of the one dimensional matrix has been stored and the $n$th element of the $n$th column of Hadamard matrix has been processed, at which time the set of $n$ subtotals will contain the results of the Hadamard multiplication.

* * * * *